United States Patent [19]

Sullivan

[11] Patent Number: 4,918,633
[45] Date of Patent: Apr. 17, 1990

[54] DIGITAL IMAGE NOISE REDUCTION METHOD AND TRANSMISSION SYSTEM

[75] Inventor: James R. Sullivan, Spencerport, N.Y.

[73] Assignee: Eastman Kodak Company, Rochester, N.Y.

[21] Appl. No.: 171,630

[22] Filed: Mar. 22, 1988

Related U.S. Application Data

[63] Continuation-in-part of Ser. No. 802,107, Nov. 25, 1985, abandoned.

[51] Int. Cl.$^4$ .......................... G06K 9/36; G06K 9/40
[52] U.S. Cl. ........................................ 364/574; 375/34
[58] Field of Search ................... 364/571.05, 577, 554, 364/574; 382/41, 9, 54; 358/135, 463, 447; 375/34, 27

[56] References Cited

U.S. PATENT DOCUMENTS

| | | | |
|---|---|---|---|
| 4,167,749 | 9/1979 | Burrus | 358/8 |
| 4,330,833 | 5/1982 | Pratt et al. | 358/167 |
| 4,441,121 | 4/1984 | Harwood et al. | 358/36 |
| 4,654,863 | 3/1987 | Belfield et al. | 375/27 |
| 4,764,971 | 8/1988 | Sullivan | 382/9 |
| 4,774,682 | 9/1988 | White | 364/554 |

OTHER PUBLICATIONS

Sage & Melsa, "Estimation Theory with Applications...", ©1971, McGraw-Hill Book Co., pp. 441–443, 452, 479, 403.

Pratt, "Digital Image Processing", pp. 18–19, ©1978, John Wiley & Sons, Inc.

Primary Examiner—Parshotam S. Lall
Assistant Examiner—Steven A. Melnick
Attorney, Agent, or Firm—Thomas H. Close

[57] ABSTRACT

A method for reducing noise in an image signal includes the steps of sampling an image to produce a sampled image signal representing pixel amplitude values, the sampled image signal including noise having a known probabilty density function (pdf); digitizing the pixel amplitude values to produce a digital image; forming an image difference signal from the digital image signal by taking the difference between successive pixel amplitude values; processing the image difference signal in digital processing means including a digital MAP filter incorporating a MAP estimator for estimating the signal and noise pdf's of a signal having a Laplacian pdf degraded by noise having a know pdf, to produce a MAP filtered image difference signal; and recovering a restored digital image signal from the MAP filtered image difference signal by summing successive amplitude difference values in the MAP filtered image difference signal. Since the pdf of the differential image signal is more nearly stationary than the image signal itself, a MAP estimator based on a differential image signal provides a more reliable estimate of the original signal statistics, even though the statistics of original signal may vary widely.

10 Claims, 6 Drawing Sheets

DIGITAL IMAGE NOISE REDUCTION METHOD AND TRANSMISSION SYSTEM

This is a continuation-in-part of U.S. Ser. No. 802,107; entitled Noise Reduction and Coding Method and Apparatus for Image Signals; filed Nov. 25, 1985; now abandoned.

TECHNICAL FIELD

The present invention relates to a method for the restoring an image signal degraded by noise, and for a system for transmitting a restored image signal over a communication channel.

BACKGROUND ART

The goal of image restoration is to operate on an image signal that has been degraded by noise (such as film grain, scanner, or quantization noise) to remove the noise from the image signal and restore the image signal to its undergraded condition.

In one type of image restoration technique, statistical models of the image process and the noise process are constructed, and operations are performed on the noise degraded image signal to undo the effects of the noise process on the image signal. One such approach is to minimize a function of the error between the original image and the processed image. The operation on the image signal is called a minimum error filter. Minimum error filters can be derived from a priori and/or a posteriori knowledge about the statistics of the image and noise processes. A priori knowledge is that which is known before examining the degraded image signal, and a posteriori knowledge is that which can be determined by examining the noise degraded image signal itself.

A minimum mean-square error filter derived substantially from a priori knowledge is generally referred to as a Wiener filter. The minimum uniform error filter derived from a priori and a posteriori knowledge is generally referred to as a maximum a posteriori (MAP) filter. The MAP filter is a linear filter that maximizes the a posteriori probability for a linear imaging system.

The successful design of a MAP filter requires an estimate of the signal and noise probability density functions (pdf's) of the signal and noise. It has been shown that the MAP filter produces optimum results in the presence of uncertainty about the statistics of the image and noise processes. See H. J. Trussel, "Notes on Linear Image Restoration by Maximizng the A Posteriori Probability," IEEE Transactions on Acoustics, Speech and Signal Processing, Vol. ASSP 26, No. 2, April 1978.

Unfortunately, the statistics of images vary considerably from image to image (i.e. the image statistics are not stationary) and although the linear MAP filter is more robust than other statistical filters in the presence of uncertainty about image statistics, the usefulness of the MAP filter is still limited due to the large variability in statistics from image to image.

It is an object of the present invention to provide a signal processing method for reducing noise in an image signal incorporating the advantages of a MAP filter that overcomes the shortcomings noted above due to the lack of stationary of the statistics of image signals.

In digital image transmission systems employing differential pulse code modulation DPCM (see DIGITAL IMAGE PROCESSING by William K. Pratt; John Wiley and Sons N.Y.; page 641) the difference between an actual pixel value, and its estimate, produced by a predictor, is quantized and coded for transmission over a communication channel. At a receiver, the decoded difference signal is reconstructed and combined with an estimate from a predictor identical to the one in the transmitter to reconstruct the original image. It is a further object of the present invention to incorporate the advantages of a MAP filter in a DPCM digital image transmission system to remove noise from the transmitted image signal.

DISCLOSURE OF THE INVENTION

The above objects are achieved according to one aspect of the present invention by providing a digital image transmission system having an encoder for converting a digital image signal to a differential pulse code modulated (DPCM) image signal. The encoder includes a differencing means for forming a DPCM image signal that is the difference between an incoming digital image signal and a prediction signal, a MAP filter that receives the DPCM image signal and produces a MAP filtered DPCM images signal, a quantizer that receives the MAP filtered DPCM image signal and produces a quantized DPCM image signal, and a feedback loop having a predictor for receiving the quantized DPCM image signal from the quantizer and generating and supplying the prediction signal to the differencing means. The MAP filter incorporates a MAP estimator for a signal having a Laplacian pdf, degraded by noise having a known pdf. The DPCM image signal is transmitted over a communications channel and decoded by a decoder having a summing means for forming an image signal representing the sum of the DPCM image signal and a prediction signal. A feedback loop including a predictor identical to the predictor in the transmitter receives the image signal from the summing means and generates and supplies the prediction signal to the summing means.

The above noted objects are achieved according to another aspect of the present invention by providing a method for reducing noise in an image signal degraded by noise having a known probability density function (pdf) including the steps of: sampling the image to produce a sampled image signal representing pixel amplitude values; digitizing the pixel amplitude values to produce a digital image signal; forming an image difference signal from the digital image signal by taking the difference between successive pixel amplitude values; processing the image difference signal in digital processing means including a digital MAP filter incorporating a MAP estimator for a signal having a Laplacian pdf degraded by noise having a known pdf, to produce a MAP filtered image difference signal; and recovering a restored digital image signal from the MAP filtered image difference signal by summing the amplitude difference values in the MAP filtered image difference signal.

The form of the MAP estimator employed in the invention is based on the empirical observation that the probability density functions of image difference signals for the types of images of interest to human observers are all very nearly Laplacian, and therefore highly stationary with only the variance changing from image to image. This observation also applies to the DPCM image signal produced in a DPCM image transmission system.

Since the pdf of the differential image signal is more nearly stationary than the image signal itself, a MAP estimator based on a differential image signal provides a more reliable estimate of the original signal statistics, even though the statistics of the original signal may vary widely.

When the MAP filter is inserted in the encoder of a differential pulse code modulation DPCM image transmission system noise correction and bandwidth compression are achieved in a single apparatus with minimum number of operations.

In preferred embodiments of the present invention, the noise to be removed from the signal is Gaussian, signal-dependent noise, such as film grain noise. A transformation is performed on the noisy image signal to render the noise independent of the image signal prior to filtering the differential image signal with the MAP filter, and the inverse transformation is performed on the restored image signal.

According to a further aspect of the invention, the image is segmented into regions of constant contrast by a generalized-likelihood-ratio-test on the variance of adjacent image pixel difference signals, and the variance of the respective segments is employed in the MAP filter.

MODES OF CARRYING OUT THE INVENTION

Before describing the signal processing method of the present invention, the derivation of the MAP estimate for a Laplacian signal degraded by signal-dependent Gaussian noise will first be described. The signal-dependent Gaussian noise model is a good model for noise such as film grain in a photographic image.

For a random signal (S) degraded by additive signal-dependent noise (n) the kth sample of the signal is given by $$X_k = S_k + n_k(S_k) \quad (1)$$

and the kth difference signal is given by $$\Delta X_k = X_k - X_{k-1} = S_k - S_{k-1} + n_k(S_k) - n_{k-1}(S_{k-1}) = \Delta S_k + \quad (2)$$

$$n_k(S_k) - n_{k-1}(S_{k-1})$$

The MAP estimator for $\Delta S$ requires a local estimate of the variance of $\Delta S$. Since $\Delta S$ is not available, its variance must be approximated by estimating the local variance of the observed signal $\Delta X$ and reducing it by an estimate of the variance for the noise. If the noise is signal independent, reducing the variance involves straight forward subtraction of the noise variance from the observed signal variance. If however, the noise is signal-dependent, as is the case in most imaging processes, direct subtraction provides only an upper bound on the variance of $\Delta S$. A preferred approach is to perform a point-to-point transformation on the observed values of the image signal that makes the noise signal independent to first-order from the image signal, and then apply the inverse transformation after the noise has been removed from the signal.

The required transformation for additive signal-dependent Gaussian noise is $$t(X) = C_1 \int_0^X \frac{1}{\sigma_n(S')} dS' + C_2, \quad (3)$$

where $C_1$ and $C_2$ are arbitrary constants, and $\sigma_n(S')$ is the square root of the signal-dependent noise variance.

For film grain noise in a photographic image signal, $\sigma_n(S')$ is the Selwyn granularity as a function of photographic density, and is measured for a given film type by well known techniques. Although $C_1$ is an arbitrary constant, the choice of $C_1$ will determine the dynamic range of the transformed signal, and is therefore conveniently chosen so that the dynamic range of the signal matches the range of the A to D converters employed in the noise reduction apparatus as described below.

Designating transformed image signals with a tilde to distinguish them from the original signals, the kth sample of the transformed image signal is $$\tilde{X}_k = t(X_k) = t(S_k) + t'(S_k) n_k(S_k) = \tilde{S}_k + \tilde{n}_k \quad (4)$$

and the corresponding transformed kth differential image signal is given by $$\Delta \tilde{X}_k = \Delta \tilde{S}_k + \tilde{n}_k - \tilde{n}_{k-1} \quad (5)$$

For such a transformed differential image signal, the variance of $\Delta S$ can be estimated to first-order by simply subtracting the transformed noise variance from the local variance estimates of the observed transformed signal.

Figure 2:
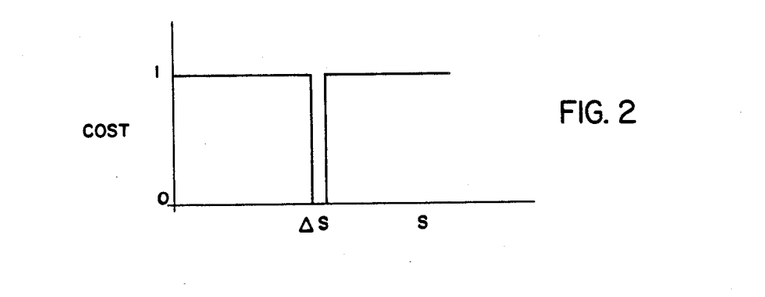
FIG. 2 is a graph illustrating the uniform error cost function employed in the MAP estimation process.

In the following description, the tildes are omitted from the notation for simplicity, with the understanding that the inverse transformation will be performed on the processed signal to recover the original noise reduced signal. The MAP estimator for $\Delta S$ is the most probable $\Delta S$ given the observed noise degraded signal $\Delta X$. The MAP estimator corresponds to the minimum cost estimate for a cost function that is equal to 1 for incorrect estimates, and 0 otherwise. A plot of such a cost function is shown in FIG. 2. Symbolically, the MAP estimate $\Delta S$ can be expressed in terms of probability density functions (pdf's) of $\Delta S$ and $\Delta X$ as:

$$\Delta S = \max_{\Delta S}\{pdf(\Delta S/\Delta X)\} \qquad (6)$$

$$= \max_{\Delta S}\{pdf(\Delta X/\Delta S)pdf(\Delta S)/pdf(\Delta X)\}$$

As noted above, it has been observed that the pdf of a differential image signal is modeled well by a Laplacian function, and assuming a Gaussian pdf for the now signal-independent noise, the distributions in equation (6) can be written as:

$$pdf(\Delta S) = K_0 \exp\left(-\frac{\sqrt{2}\,|\Delta S|}{\sigma_{\Delta S}}\right) \qquad (7)$$

$$pdf(\Delta X/\Delta S) = K_1 \exp\left(\frac{-(\Delta X - \Delta S)^2}{4\sigma_n^2}\right) \qquad (8)$$

where $K_0$ and $K_1$ are normalization constants. The results are simplified if the natural logarithm of the pdf's are used rather than the pdf's themselves, and since the natural logarithm is a monotonic function, the substitution does not change the MAP estimate, which becomes:

$$\Delta S = \max_{\Delta S}\{\ln pdf(\Delta X/\Delta S) + \ln pdf(\Delta S) - \ln pdf(\Delta X)\} \qquad (9)$$

Since the last term in equation (9) is not a function of $\Delta S$, it can be dropped as can the normalization constants. Substituting equations (7) and (8) into equation (9), the MAP estimate becomes:

$$\Delta S = \max_{\Delta S}\left(\frac{\sqrt{2}\,|\Delta S|}{\sigma_{\Delta S}} - \frac{(\Delta X - \Delta S)^2}{4\sigma_n^2}\right) \qquad (10)$$

This equation is maximized for the two cases $\Delta S \leq 0$ and $\Delta S \geq 0$ by differentiating with respect to $\Delta S$ and setting the result equal to zero as follows.

First Case: $\Delta S \leq 0$ $$\Delta S = \max_{\Delta S}\left(\frac{\sqrt{2}\,\Delta S}{\sigma_{\Delta S}} - \frac{(\Delta X - \Delta S)^2}{4\sigma_n^2}\right) \qquad (11)$$

differentiating with respect to $\Delta S$ yields $$\Delta S = \Delta X + \frac{2\sqrt{2}\,\sigma_n^2}{\sigma_{\Delta S}} \qquad (12)$$

if $\Delta X + \frac{2\sqrt{2}\,\sigma_n^2}{\sigma_{\Delta S}} \leq 0$ this solution represents the zero-slope maximum consistent with $\Delta S \leq 0$, however, if $$\Delta X + \frac{2\sqrt{2}\,\sigma_n^2}{\sigma_{\Delta S}} > 0,$$

the zero-slope maximum so on the positive side of $\Delta S$ and the maximum consistent with $\Delta S \leq 0$ is at $\Delta S = 0$. The MAP estimate for the first case is therefore $$\Delta S = \begin{cases} \Delta X + \frac{2\sqrt{2}\,\sigma_n^2}{\sigma_{\Delta S}}, & \Delta X < \frac{-2\sqrt{2}\,\sigma_n^2}{\sigma_{\Delta S}} \\ 0 & \text{, otherwise} \end{cases} \qquad (13)$$

Second Case: $\Delta S \geq 0$ $$\Delta S = \max_{\Delta S}\left(\frac{\sqrt{2}\,\Delta S}{\sigma_{\Delta S}} - \frac{(\Delta X - \Delta S)^2}{4\sigma_n^2}\right) \qquad (14)$$

and again differentiating with respect to $\Delta S$ and setting the result to zero gives $$\Delta S = \Delta X - \frac{2\sqrt{2}\,\sigma_n^2}{\sigma_{\Delta S}} \qquad (15)$$

Now the zero slope maximum consistent with $\Delta S \geq 0$ occurs when $\Delta X$ is greater than zero, and the maximum value is at $\Delta S = 0$ when it is less than zero. For $\Delta S \geq 0$, the MAP estimate is therefore:

$$\Delta S = \begin{cases} \Delta X - \frac{2\sqrt{2}\,\sigma_n^2}{\sigma_{\Delta S}}, & \Delta X > \frac{2\sqrt{2}\,\sigma_n^2}{\sigma_{\Delta S}} \\ 0 & \text{, otherwise} \end{cases} \qquad (16)$$

combining the first and second cases results in $$\Delta S = \begin{cases} \Delta X + \frac{2\sqrt{2}\,\sigma_n^2}{\sigma_{\Delta S}}, & \Delta X < \frac{-2\sqrt{2}\,\sigma_n^2}{\sigma_{\Delta S}} \\ \Delta X - \frac{2\sqrt{2}\,\sigma_n^2}{\sigma_{\Delta S}}, & \Delta X > \frac{2\sqrt{2}\,\sigma_n^2}{\sigma_{\Delta S}} \\ 0, & |\Delta X| \leq \frac{2\sqrt{2}\,\sigma_n^2}{\sigma_{\Delta S}} \end{cases} \qquad (17)$$

Figure 3:
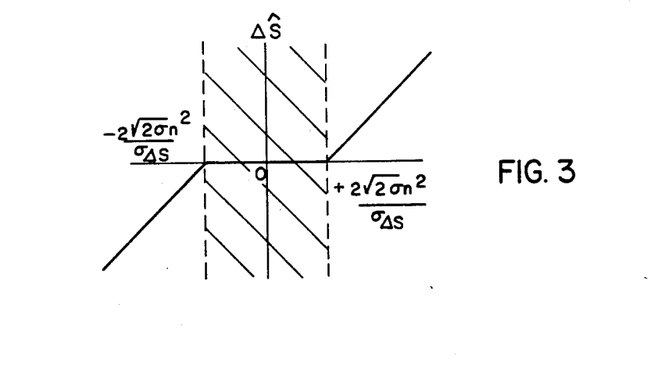
FIG. 3 is a graph showing the adaptive, nonstationary coring effect of the MAP filter on an image difference signal.

FIG. 3 is a plot of $\Delta S$ vs. $\Delta X$ generated by the MAP estimator defined by equation (17). As can be seen from FIG. 3, the MAP estimator has the effect of a coring operator on the image difference signal $\Delta X$. In the coring region of the function, shown by cross hatching, the estimated value of the image difference signal $\Delta S$ is set to zero. In the regions outside the coring region, the estimated value of the image difference signal is biased toward zero by an amount directly related to the noise variance and that is inversely related to the square root of the estimated differential signal variance. The larger the noise variance or the smaller the image difference signal variance, the larger the bias. In the cored region, where the observed $\Delta X$ values are smaller than $$\frac{2\sqrt{2}\,\sigma_n{}^2}{\sigma_{\Delta S}},$$

the signal $\Delta S$ is set to zero, resulting in a significant smoothing in uniform low contrast areas of an image. The coring threshold is adaptive to the amplitude of the differential signal and to changes in the estimated variance of the differential signal and noise.

To implement the MAP filter, it is necessary to estimate $\sigma_{n2}$ and $\sigma_{\Delta S2}$ which are defined as $$\sigma_{n2} = C_{12} \tag{18}$$

$$\sigma_{\Delta S2} = \sigma_{\Delta X2} - 2\sigma_{n2} \tag{19}$$

where $C_1$ is the constant employed in the transformation equation (3) above.

The unknown parameter $\sigma_{\Delta X2}$ is estimated from local statistics of the image difference signal by a maximum-likelihood estimator (MLE) for the standard deviation of a Laplacian pdf given by $$\sigma_{\Delta X} = \sqrt{2}\,/n\,\sum_{i=1}^{n} |\Delta X(i)| \tag{20}$$

over a sliding window of fixed length (e.g. 10 samples).

Alternatively, the image difference signal may be segmented into variable length regions having stationary statistics. This is equivalent to segmenting the image signal into regions of constant contrast. The segmenting method, described below, is based on a generalized-likelihood-ratio-test (GLRT) for Laplacian data. The test statistically examines the hypothesis $H_\phi$ that the standard deviation of a given stationary segment is equivalent to the standard deviation of a second segment that is adjacent to the given segment and composed of a single image difference signal sample value. If the hypothesis is accepted, the new image difference signal sample value is added to the current segment, the standard deviation is updated, and the hypothesis is checked against the next sample value. If the hypothesis is rejected, the current segment is closed and the new sample value is assumed to be the first sample in a new segment. This method of segmenting images into statistically stationary segments is th subject of copending Patent Application No. 802,113 now U.S. Pat. No. 4,764,971.

Figure 1:
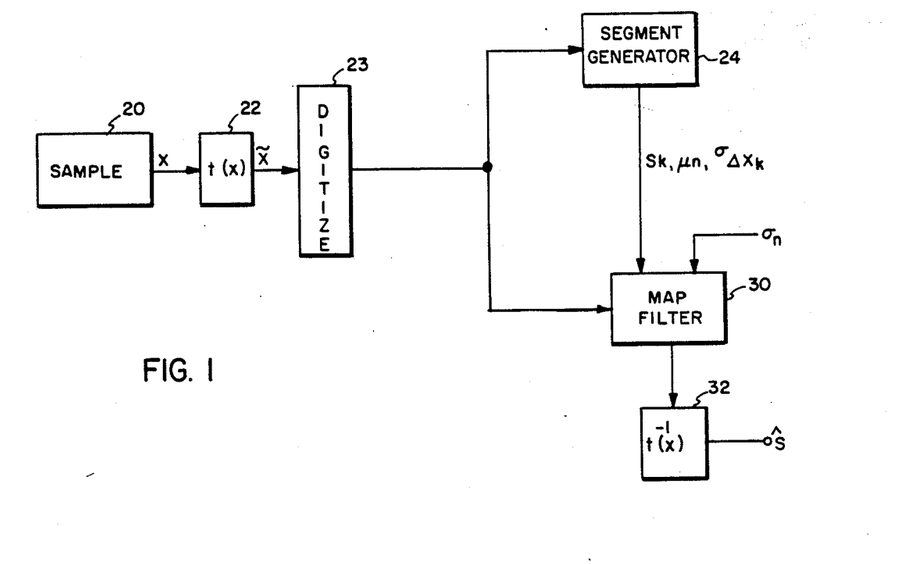
FIG. 1 is a block diagram illustrating the noise reduction method according to the present invention.

The of processing an image signal with the MAP filter to reduce noise according to the present invention will now be described with reference to FIG. 1. The method shown in FIG. 1 can be performed in an appropriately programmed general purpose digital computer, or in hardware or firmware specifically designed for implementing the operations described below.

The image signal is sampled 20 by a sampling means such as a solid state image sensing array to produce a sampled image signal having pixel amplitude values representing luminesce, density or brightness. The sampled image signal X having signal dependent noise n(S) is transformed 22 by a transformation filter to render the noise independent of the signal. The transformation t(X) is described by equation (3) above. The transformed signal X is digitized 23 by a digitizer to produce a digital image signal. The digital image signal is segmented 24 in a segment generator that forms an image difference signal for each line of the scanned image, and segments the image difference signal into segments having stationary statistics, using a generalized-likelihood-ratio-test (GLRT) as described below. The segment generator produces signals $S_k$ representing the location of the start of the segments, the variance $\sigma \Delta X_k$ of the image difference signal in the segment, and the mean value $\mu_k$ of the image signals in the segment. The mean value of the image signal is employed in reconstructing the image signal as described below. The image difference signal is MAP filtered 30 in a MAP filter that receives the delayed image signal, the statistical information $S_k$, $\mu_k$, and $\sigma \Delta X_k$ and the variance of the noise $\sigma_n$, supplied externally as described below, generates an image difference signal for each line of the image, and performs the MAP restoration on the noisy image difference and recovers a restored digital image signal from the MAP filtered image difference signal. The restored digital image signal is inverse transformed 32 in an inverse transformation filter to recover the noise restored signal S. For $X = t(x)$, the inverse transform can be seen from equation (3) to be $t^{-1}(X) = x$. The step of forming an image difference signal is performed in both the generation step and the MAP filter step in the particular embodiment described. Alternatively, the image difference signal may be formed in a separate step and supplied to the segment generation step and the MAP filter step.

Figure 4:
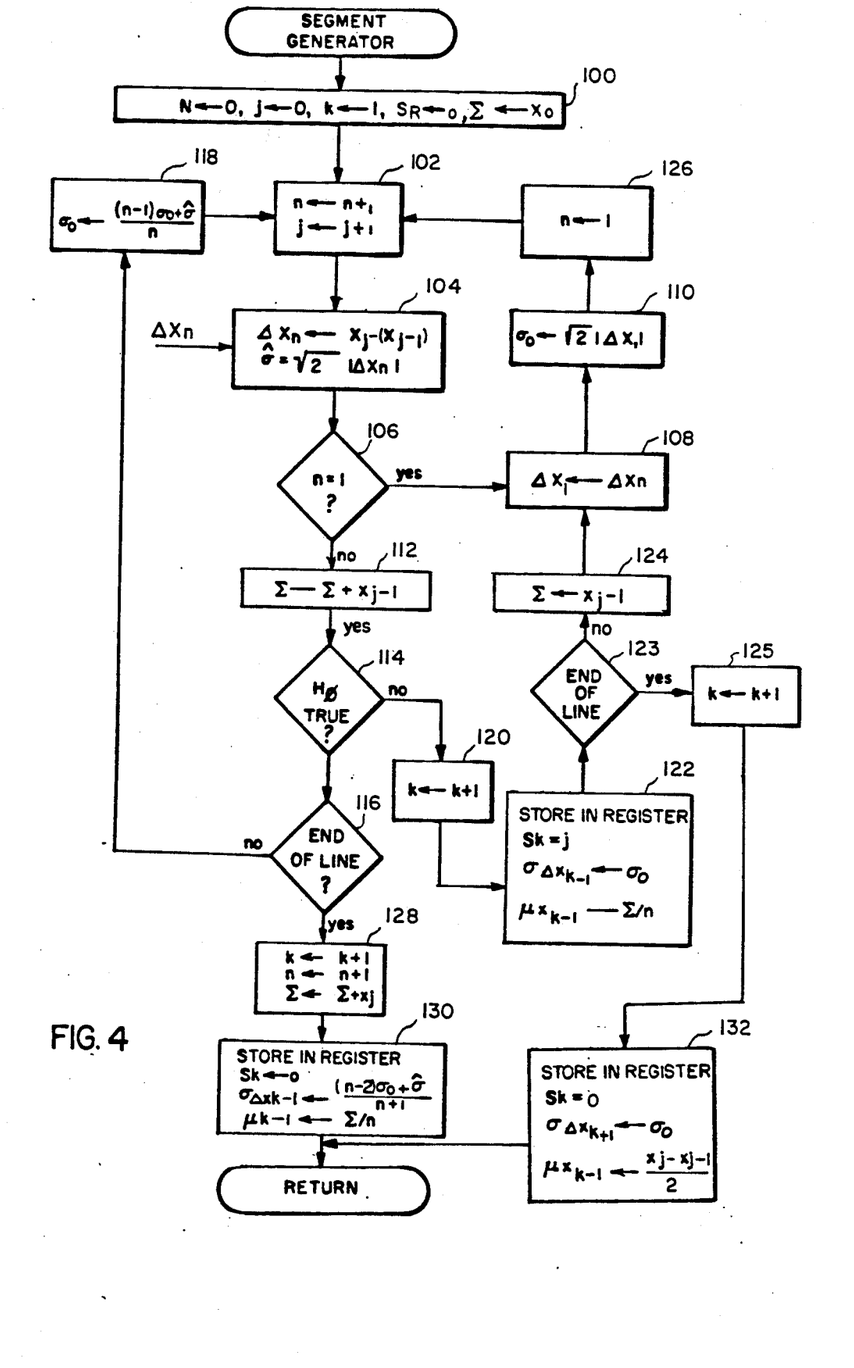
FIG. 4 is a flow chart illustrating an image segment generator according to a preferred embodiment of the present invention.

Detailed operation of the segment generator 24 will now be described with reference to the flow chart of FIG. 4. A person skilled in the art of computer programming will readily be able to produce a computer program for a general purpose digital computer to implement the segment generator described in FIG. 4. The following description assumes that the image signal is in the form of a raster scan. At the start of each scan line, the segment generator 24 initializes (100) internal counters: n indicating the number of pixels in a segment; j indicating the pixel number in the line; and k indicating the number of segments. The segment generator sets a pointer $S_k$ that points to the starting pixel for the kth segment, and initializes a sum $\Sigma$ used to compute the mean value of the image signal X in a segment. The segment generator increments n and j by 1 (102) and then forms (104) a difference signal $\Delta X_n$ between the jth and j-1st samples of the image signal. A maximum likelihood estimate $\sigma$ of the variance of the difference signal $\Delta X_n$ as given by equation (20) is then computed (104).

Next, the segment generator checks (106) to see if this is the first pixel in a segment (n = 1). If so, $\Delta X_1$ is set (108) equal to $\Delta X_n$, $\sigma_0$ (an estimate of the variance of the segment as generated thus far) is set (110) to equal the square root of two times the absolute value of $\Delta X_1$ and in is incremented by 1 (102). The next difference signal $\Delta X_n$ is formed (104), and the maximum likelihood estimate $\sigma$ of the variance of the difference signal is formed (104). This time, n does not equal 1, and the sum $\Sigma$ is incremented by adding $X_{j-1}$ (112). Next the null hypothesis ($H_\phi$) that the sigma value of the present segment is equivalent to the sigma value of the present segment plus the next image difference signal sample is checked (114). If the null hypothesis is true, and it is not the end of the scan line (116), $\sigma_0$ is updated (118) by factoring in $\sigma$, and another $\Delta X$ is formed (104 and added to the segment for testing. If the null hypothesis is false, the segment is ended, k is incremented (120) by 1, and the values $S_k$, $\sigma \Delta X_{k-1}$ and $\mu_{k-1}$ are stored (122) in a register. A check is made to see if this is the end of the line, if so, k is incremented by one (125), if not, $\Sigma$ is updated (124), $\Delta X_1$ is set to $\Delta X_n$ (108), $\sigma_0$ is set to the square root of two times the absolute value of $\Delta X_1$ (110), n is set to 1 (126), and the next segment building process is started. When the last pixel of a scan line is reached (end of line equal yes) k and n are incremented, sigma is updated by adding the last X value (128), $S_k$ is set to 0, $\sigma\Delta X_{k-1}$ is updated by factoring in the most recent $\sigma$, $\mu_{k-1}$ is set to $\Sigma/n$, and these values are stored in the register (130,132) for the last segment of the line. This segmentation process has single pixel resolution because a new segment can start at any pixel and therefore the maximum number of segments possible is equal to the number of pixels in a line, and the storage register is sized accordingly.

Figure 5:
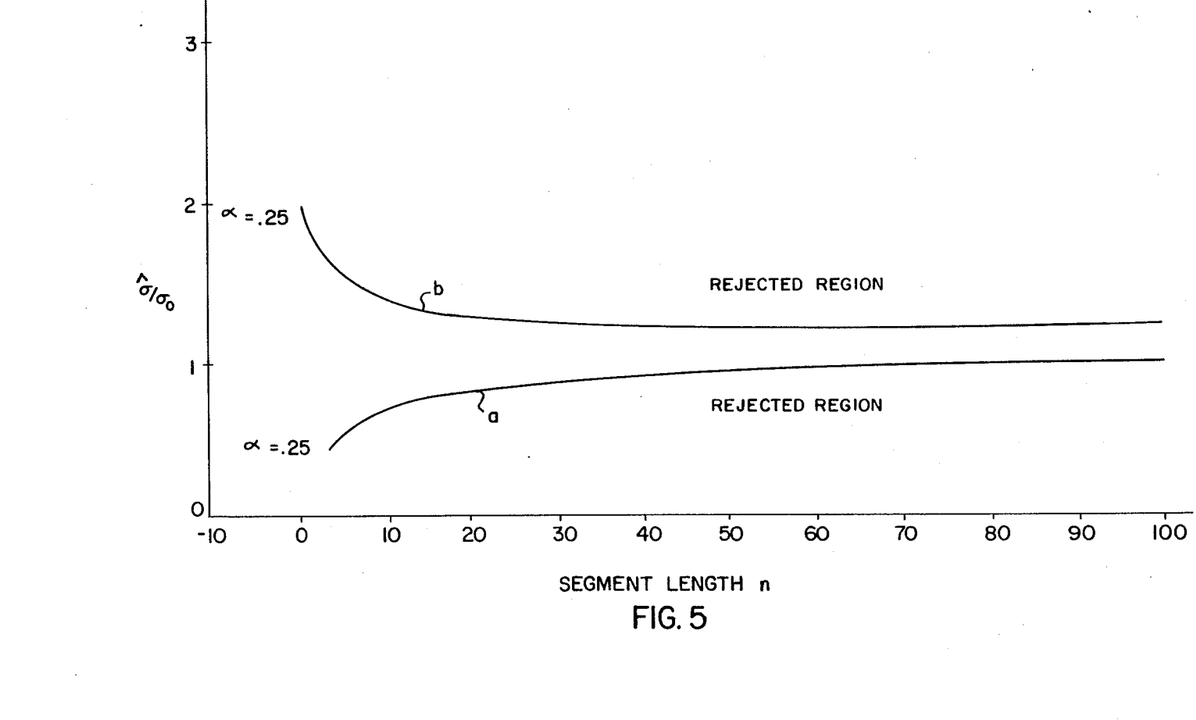
FIG. 5 is a graph illustrating the functional form of predetermined constants employed in the generalized-likelihood-ratio-test used in the segment generator.

The check on the truth of the null hypothesis $H_{100}$ involves testing whether $$\sigma/\sigma_0 \leq a, \text{ or } \geq b \quad (21)$$

where a and b are constants derived from estimation theory that depend on the value of n, the number of pixels in the segment. The equations for a and b for a Laplacian distribution are $$\alpha/2 = \left\{ 1 - e^{-an} \sum_{r=0}^{n-1} \frac{(an)^{n-1-r}}{(n-1-r)!} \right\} \quad (22)$$

and;

$$\alpha/2 = e^{-bn} \sum_{r=0}^{n-1} \frac{(bn)^{n-1-r}}{(n-1-r)!} \quad (23)$$

respectively, where a is an empirically selected level of significance for the test. An equivalent statement of the decision rule is to reject $H_\phi$ $$\text{whenever } \frac{\sigma}{\sigma_0} \leq a, \text{ or } \frac{\sigma}{\sigma_0} \geq b \text{ where} \quad (24)$$

$$\text{Prob}(\sigma/\sigma_0 \leq a | H\phi) + \text{Prob}(\sigma/\sigma_0 \geq b | H\phi) = \alpha$$

for a selected level of significance $\alpha$, the values of a and b vs. n are computed off-line using equations (23) and (24) and stored in a memory. FIG. 5 shows a plot of the dependence of a and b on n for a level of significance $\alpha$ of 0.25.

Figure 6:
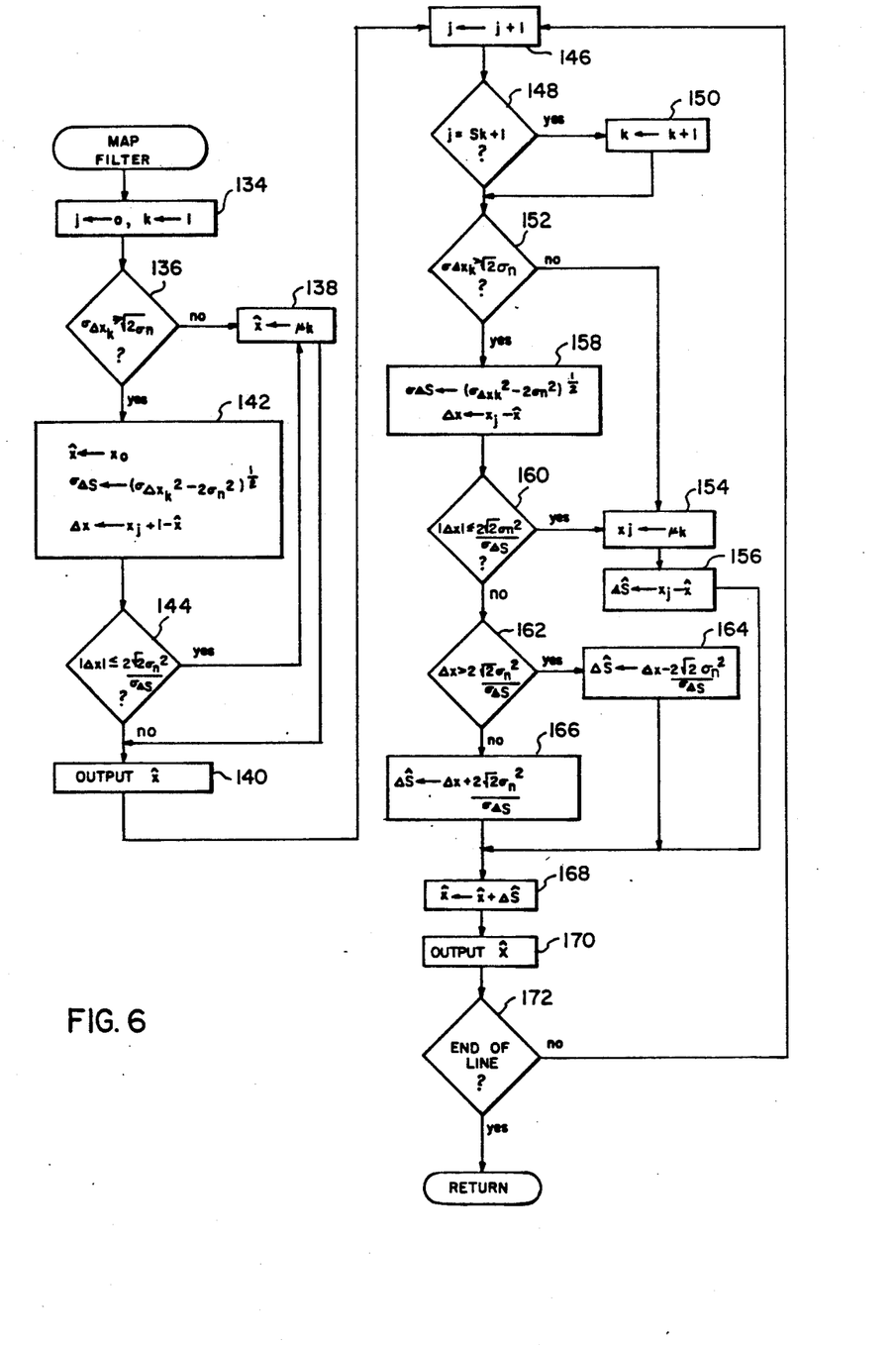
FIG. 6 is a flow chart illustrating a MAP filter according to a preferred embodiment of the present invention.

Turning now to FIG. 6, the MAP filter will be described in more detail. A person skilled in the art of computer programming will readily be able to produce a program for a general purpose digital computer to implement the MAP filter described in FIG. 6. Bearing in mind that the MAP filter has available to it the mean $\mu_k$ of the image signals in a segment and the variance $\sigma\Delta X_k$ of the image difference signals from the stationary segments in this line of image signals provided from the segment generation step 24.

The MAP filter initializes counters j and k (134), representing the pixel number and the segment number, respectively. Then the variance of the first segment $\sigma\Delta X_1$ is checked (136) to see if it is greater than the square root of two times the variance of the noise $\sigma_n$. If not, the first processed image value X is set equal to the mean value $\mu_k$ of the first segment (138), and the processed value X is output (140) as the first processed image value. If the variance of the first segment is greater than the square root of two times the the variance of noise, the first processed value X is set equal to the first signal value $X_0$. The estimated variance $\sigma_{\Delta S}$ of the first segment is then adjusted by the root square of the noise variance, and the next difference signal is calculated (142). The absolute value of the next difference signal $\Delta X$ is tested (144) to determine whether it is in the adaptive coring region $$\left( \leq \frac{2\sqrt{2}\ \sigma_n^2}{\sigma_{\Delta S}} \right).$$

If so, the value of X is replaced by the mean value $\mu_k$ for the segment (138). If not, the first value $X_0$ is output (140). Next, j is incremented (146) by one and a check (148) is made to determine if a new segment has been reached (j=$S_{k+1}$?). If so, k is also incremented by one (150).

Next, the value of the variance of the signal $\sigma\Delta X_k$ is checked (152) to see if it is greater than the square root of two times $\sigma_n$. If not, the value of the signal $X_j$ is replaced (154) by the mean value $\mu_k$ of the signal in the segment. Then a noise reduced image difference signal $\Delta S$ is formed (156) by subtracting the previously determined signal value X from the jth sample $X_j$. If on the other hand, the variance of the segment $\sigma\Delta X_k$ is greater (152) than the square root of two times $\sigma_n$, a new estimate of the variance is computed by reducing the variance by the root square of the noise variance, and the next difference signal $\Delta X$ is formed (158). The absolute value of the image difference signal is checked (160) to determine whether it is within the adaptive coring region $$\left( \leq \frac{2\sqrt{2}\ \sigma_n^2}{\sigma_{\Delta S}} \right).$$

If so, the value of X is replaced If so, the value of $X_j$ is replaced by the mean value $\mu_k$ of the segment (154), and a noise reduced difference signal $\Delta S$ is formed (156) by subtracting the last noise reduced image signal X from $X_j$.

If the magnitude of the image difference signal lies outside of the coring region, the polarity of the image difference signal is tested (162)

$$\left( \Delta X > \frac{2\sqrt{2}\ \sigma_n^2}{\sigma_{\Delta S}} ? \right)$$

and depending on whether it is positive or negative, a noise reduced image difference signal $\Delta S$ is formed by respectively reducing (164) or increasing (166) the image difference signal $\Delta X$ by $$\frac{2\sqrt{2}\ \sigma_n^2}{\sigma_{\Delta S}},$$

Finally, the new restored image signal X is recovered by adding (168) the noise reduced difference signal $\Delta S$ to the previous value of X. The step of recovering the restored image signal is shown as part of the MAP filter, but may be performed as a separate step. The new value of the noise reduced image signal is output (170), and a check is made (172) to determine whether the end of the line has been reached. If not, the value of j is incremented by one (146), and the loop is repeated until the end of the scan line.

In the implementation described above, it will be noted that whenever $\sigma\Delta X_k$ was less than or equal to the square root of two times $\sigma_n$, or when the absolute value of $\Delta X$ was less than or equal to two times the square root of $\sigma_n^2/\sigma\Delta S$ the value of the signal was changed to the mean value of the signal in the segment. This has the effect of forcing the restored signal to have the average value of the signal in a area where there is some signal variance ($\sigma\Delta X>0$) but where the variance is not large enough to move the signal out of the coring region. The result is some additional smoothing of the noise restored image signal.

Figure 7:
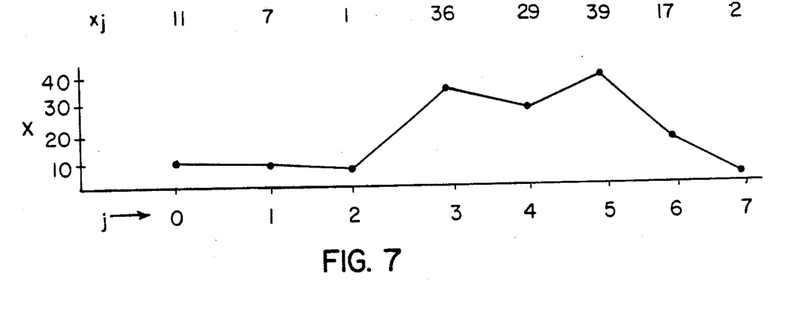
FIG. 7 is a graph illustrating a portion of an image signal useful in explaining the operation of the present invention.

The signal processing method for reducing noise in an image signal will now be described with reference to a numerical example shown in the graph of FIG. 7. FIG. 7 shows the first seven samples in a line of image information. The sample values $X_j$ are shown above the graph. The level of significance $\alpha$ was chosen to be 0.25, i.e. 75% confidence that the rejection of the null hypothesis $H_{100}$ is correct. A table of values for a and b for segments of given length n at a confidence level of 75% are shown in Table 1 below. These values were computed from equations (22) and (23) and stored in a table look-up memory.

TABLE 1

| n- | 1 | 2 | 3 | 4 | 5 | 6 | 7 | 8 | 9 | 10 |
|---|---|---|---|---|---|---|---|---|---|---|
| a- | .134 | .306 | .408 | .476 | .524 | .562 | .592 | .616 | .636 | .654 |
| b- | 2.078 | 1.802 | 1.664 | 1.578 | 1.518 | 1.474 | 1.440 | 1.412 | 1.388 | 1.368 |

The signal shown in FIG. 7 is segmented as shown by the values in Table 2 where $\Delta_{ij}=|X_i-X_j|$.

TABLE 2

| test | n | j | k | $\Delta X_n$ | $\sigma$ | $\sigma_0$ | $\sigma/\sigma_0$ | $\Sigma$ | $S_k$ | $\sigma\Delta X_{k-1}$ | $\mu X_{k-1}$ |
|---|---|---|---|---|---|---|---|---|---|---|---|
| | 0 | 0 | 1 | — | — | — | — | $X_0$ | 0 | — | — |
| | 1 | 1 | 1 | $X_1 - X_0$ | $\sqrt{2}\,\Delta_{10}$ | — | — | $X_0$ | 0 | — | — |
| n = 1 | 2 | 2 | 1 | $X_2 - X_1$ | $\sqrt{2}\,\Delta_{21}$ | $\sqrt{2}\,\Delta_{10}$ | 1.50 | $X_0 + X_1$ | 0 | — | — |
| n = 1 $H_\phi$ true end false | 3 | 3 | 1 | $X_3 - X_2$ | $\sqrt{2}\,\Delta_{32}$ | $\frac{\sqrt{2}}{2}(\Delta_{21}+\Delta_{10})$ | 7.00 | $X_0 + X_1 + X_2$ | 0 | — | — |
| n = 1 $H_\phi$ false | 1 | 3 | 2 | $X_3 - X_2$ | $\sqrt{2}\,\Delta_{32}$ | $\sqrt{2}\,\Delta_{32}$ | — | $X_2$ | 3 | $\frac{\sqrt{2}}{2}(\Delta_{21}+\Delta_{10})$ | $(X_0 + X_1 + X_2)/3$ |
| | 2 | 4 | 2 | $X_4 - X_3$ | $\sqrt{2}\,\Delta_{43}$ | $\sqrt{2}\,\Delta_{32}$ | 0.20 | $X_2 + X_3$ | 3 | $\frac{\sqrt{2}}{2}(\Delta_{21}+\Delta_{10})$ | $(X_0 + X_1 - X_2)/3$ |
| n = 1 $H_\phi$ false | 1 | 4 | 3 | $X_4 - X_3$ | $\sqrt{2}\,\Delta_{43}$ | $\sqrt{2}\,\Delta_{43}$ | — | $X_3$ | 4 | $\sqrt{2}\,\Delta_{32}$ | $(X_2 + X_3)/2$ |
| | 2 | 5 | 3 | $X_5 - X_4$ | $\sqrt{2}\,\Delta_{54}$ | $\sqrt{2}\,\Delta_{43}$ | 1.43 | $X_3 + X_4$ | 4 | $\sqrt{2}\,\Delta_{32}$ | $(X_2 + X_3)/2$ |
| n = $H_\phi$ true end false | 3 | 6 | 3 | $X_6 - X_5$ | $\sqrt{2}\,\Delta_{65}$ | $\frac{\sqrt{2}}{2}(\Delta_{54}+\Delta_{43})$ | 2.58 | $X_3 + X_4 + X_5$ | 4 | $\sqrt{2}\,\Delta_{32}$ | $(X_2 + X_3)/2$ |
| n = 1 $H_\phi$ false | 1 | 6 | 4 | $X_6 - X_5$ | $\sqrt{2}\,\Delta_{65}$ | $\sqrt{2}\,\Delta_{65}$ | — | $X_5$ | 6 | $\frac{\sqrt{2}}{2}(\Delta_{54}+\Delta_{43})$ | $(X_3 + X_4 + X_5)/3$ |
| | 2 | 7 | 4 | $X_7 - X_6$ | $\sqrt{2}\,\Delta_{76}$ | $\sqrt{2}\,\Delta_{65}$ | 0.68 | $X_5 + X_6$ | 6 | $\frac{\sqrt{2}}{2}(\Delta_{54}+\Delta_{43})$ | $(X_3 + X_4 + X_5)/3$ |
| n = 1 $H_\phi$ true end true | 3 | 7 | 5 | $X_7 - X_6$ | $\sqrt{2}\,\Delta_{76}$ | $\sqrt{2}\,\Delta_{65}$ | 0.68 | $X_5 + X_6 + X_7$ | 0 | $\frac{\sqrt{2}}{2}(\Delta_{76}+\Delta_{65})$ | $(X_5 + X_6 + X_7)/3$ |

The statistical values supplied to the MAP filter from the segmentation step are shown in Table 3.

TABLE 3

| k | 1 | 2 | 3 | 4 | 5 |
|---|---|---|---|---|---|
| $S_k$ | 0 | 3 | 4 | 6 | 0 |
| $\sigma\Delta X_k$ | 7.07 | 49.5 | 12.02 | 26.16 | — |
| $\mu X_k$ | 6.33 | 18.5 | 34.67 | 19.33 | — |

Next, using the statistical values generated in the segmentation step, the values produced by the MAP filter are as shown in Table 4.

TABLE 4

| Pixel (j) | | 0 | 1 | 2 | 3 | 4 | 5 | 6 | 7 |
|---|---|---|---|---|---|---|---|---|---|
| S ($\sigma_s = 12.85$) | | 8 | 6 | 2 | 27 | 35 | 35 | 15 | 5 |
| n ($\sigma_n = 4.28$) | | 3 | 1 | −1 | 9 | −6 | 4 | 2 | −3 |
| X = S + n | | 11 | 7 | 1 | 36 | 29 | 39 | 17 | 2 |
| from segment generator | (k, $S_k$) | | (1,0) | | (2,3) | (3,4) | | (4,6) | (5,0) |
| | $\mu_k$ | | 6.33 | | 18.5 | 34.67 | | 19.33 | |
| | $\sigma \Delta X_k$ | | 7.07 | | 49.5 | 12.02 | | 26.16 | |
| $\sigma \Delta S$ | | — | 3.654 | 3.654 | 49.13 | 10.38 | 10.38 | 25.45 | 25.45 |
| ΔX | | — | 0.67 | −5.33 | 29.67 | −5.95 | 5.01 | −17.01 | −17.04 |
| $2\sqrt{2}\ \sigma_n^2/\sigma_{\Delta S}$ | | — | 14.18 | 14.18 | 1.05 | 4.99 | 4.99 | 2.04 | 2.04 |
| ΔS | | — | 0 | 0 | 28.62 | −0.96 | 0.02 | −14.97 | −15.00 |
| X | | 6.33 | 6.33 | 6.33 | 34.95 | 33.99 | 34.01 | 19.04 | 4.04 |

In the example given, the root mean-square error between the original signal S and the noise degraded signal X was $$RWSE = \sqrt{\frac{1}{8} \sum_{j=1}^{8} (X - S)^2} = 4.43 \approx \sigma_n$$

After restoration by the MAP filter, the RMSE error was $$RWSE = \sqrt{\frac{1}{8} \sum_{j=1}^{8} (X - S)^2} = 3.607$$

which represents approximately a 20% decrease in the root mean square noise in the signal.

In a DPCM digital image transmission system, the DPCM image signal that is transmitted over a communication channel is produced by forming the difference between an incoming image signal and a prediction signal produced in a feedback loop by a predictor, based on the previous value of the DPCM image signal. Like the image difference signal discussed above, the DPCM image signal is an image difference signal that also exhibits a Laplacian statistical distribution.

Figure 8:
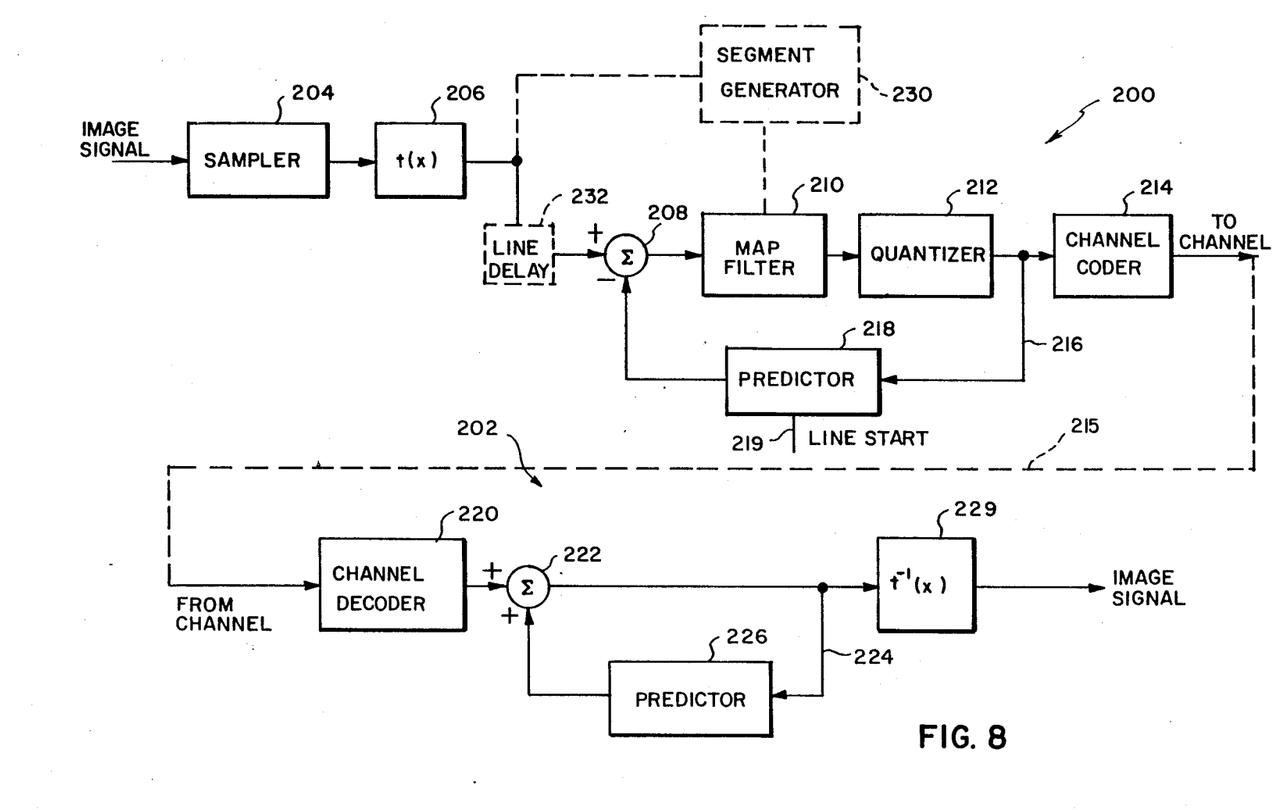
FIG. 8 is a block diagram illustrating a DPCM encoder and decoder including a MAP filter according to the present invention.

Since the MAP filter described above operates on a differential image signal having Laplacian statics, it can be implemented in the transmitter of a differential pulse code modulation (DPCM) image transmission system to remove noise in the image signal. FIG. 8 is a block diagram of a DPCM digital image transmission system including a MAP filter according to the present invention. The DPCM digital image transmission system includes an encoder generally designated 200, and a decoder generally designated 202.

The encoder 200 includes a sampler 204 for sampling an image signal to produce a digital image signal and a transformation filter 206 to make the noise in the signal independent of the signal. The transformation t(x) performed by transformation filter 206 is described in equation (3) above. The transformed digital image signal is supplied to a differencing node 208 where a prediction signal is subtracted from the digital image signal to produce a DPCM image signal. The DPCM image signal is supplied to a MAP filter 210, where it is filtered to remove noise. The noise filtered DPCM image signal is supplied to a Quantizer 212, where it is quantized. The quantized DPCM image signal is supplied to a channel coder 214, where it is coded for transmission over a communication channel 215. The quantized DPCM image signal is also supplied to a feedback loop 216 containing a predictor 218 that generates the prediction signal that is subtracted from the image signal to produce the DPCM image signal.

The predictor 218 supplies a prediction of zero at the start of each line in response to a line start signal 219 so that the first value in a line that is supplied to the MAP filter 210 is the actual image signal value rather than the DPCM image signal. The decoder 202 for receiving and decoding the DPCM image signal on the channel includes a channel decoder 220, a summing node 222 for summing the DPCM image signal and a prediction signal, a feedback loop 224 including a predictor 226 for forming the prediction signal from the sum of the DPCM image signal and the prediction signal, and an inverse transformer 228 to perform the inverse transform of the transformation performed by transformer 206 in the encoder on the recovered image signal.

As described above with respect to the signal processing method for reducing noise in an image signal, the image difference signal may be segmented into variable length regions having stationary statistics, and the statistics of the segments supplied to the MAP filter. Similarly, the the DPCM image signal may be segmented into regions of stationary statistics, and the statistics employed by the MAP filter 210 in the encoder 200. A segment generator 230 for generating the segments and their statics and supplying the statistics to the MAP filter 210 is shown by dashed lines in FIG. 8. To allow the segment generator 230 time to generate the statistical information before it is applied to the DPCM image signal, a one line delay 232 is provided at the input to differencing node 208. Like the MAP filter 210, the preferred implementation of the segment generator 230 is by a programmed microprocessor.

Sampler 204, differencing node 208, quantizer 212 channel coder 214, and feedback loop 216 including predictor 218, channel decoder 220, summing node 222, and feedback loop 224 including predictor 226 are well known in the prior art, requiring no further description. Transformer 206, MAP filter 210, and inverse transformer 228 are preferably implemented by a programming a microprocessor in a microprocessor based DPCM encoder/decoder board.

A Fortran program for implementing a DPCM encoder and decoder having a transformer to convert an input image with signal dependent noise to signal independent noise, an inverse transformer, a MAP filter, and an image segmentor is included in Appendix A.

INDUSTRIAL APPLICABILITY AND ADVANTAGES

The signal processing method for reducing noise in an image signal is useful for removing the noise from images such as photographic images and X-ray images. The method has the advantage that since the MAP restoration operates on the image difference signal which has more nearly stationary statistical properties than the image signal itself, the statistical assumptions that are required in the image restoration process are more nearly valid, and hence result in more accurate image restoration. The method has the further advantage that since the differential image data has a smaller dynamic range than the direct image data, fewer bits are required to express the image data, and the MAP filter operating on image difference data can be implemented in less complex hardware.

Furthermore, for a Laplacian image difference signal pdf and a Gaussian noise pdf, the MAP filter for the image difference signal behaves as an adaptive coring operator on the image difference signal with the only empirically derived parameter being the confidence level $\alpha$. Because the coring operator is self adaptive and based on statistical criteria, it is more robust than prior art empirically derived coring operators, thereby making the method applicable to a wider class of images.

Since the MAP filter is linear in the uncored region and a null operator in the cored region, and since a DPCM image signal is an image difference signal with Laplacian statistics, the MAP filter is easily implemented in the transmitter of a DPCM data transmission system for transmitting and restoring images degraded by Gaussian noise.

```
      APPENDIX A
      Copyright 1988
      Eastman Kodak Company
            PROGRAM RESTOR
C
C PROGRAM TO RESTORE AND DPCM ENCODE A NOISY INPUT SIGNAL USING A
C SEGMENTATION TECHNIQUE (DSEGMT) TO ISOLATE STATIONARY DIFFERENTIAL
C SIGNAL REGIONS AND A MAP ESTIMATOR FOR A LAPLACIAN MODEL OF THE
C DIFFERENTIAL SIGNAL AND GAUSSIAN ADDITIVE MODEL FOR THE NOISE.
C THIS ROUTINE IS FOR ONE IMAGE LINE AND A FIRST ORDER PREDICTOR
C IN THE DPCM ENCODER.  THE KEY VARIABLES ARE
C
C            NPTS  - NUMBER OF POINTS IN THE LINE
C            IN    - INPUT NOISY IMAGE DATA
C            OUT   - OUTPUT RESTORED AND ENCODED IMAGE DATA
C            MEAN  - PIXEL MEANS FOR STATIONARY SIGNAL REGIONS
C            ESIG  - PIXEL SIGMAS FOR STATIONARY SIGNAL REGIONS
C            RA    - PREDICTOR COEFFICIENT FOR DPCM
C            NSIG  - MODEL VALUE FOR NOISE SIGMA
C            H0L   - LOW SIGNIFICANCE VALUE FOR DSEGMT STATIONARITY TEST
C            H0H   - HIGH SIGNIFICANCE VALUE FOR DSEGMT STATIONARITY TEST
C            NLEV  - NUMBER OF LEVELS IN DPCM ENCODER
C
      PARAMETER (NPTS=512,NLEV=16)
      COMMON/BLOCK/IN(NPTS),OUT(NPTS),MEAN(NPTS),ESIG(NPTS-1),DEC(NLEV),
     $              REC(NLEV),RA,NSIG,H0L,H0H
      REAL IN,OUT,REC,DEC,MEAN,ESIG,NSIG,NVAR2
      MID=NLEV/2
      CALL DSEGMT
      NVAR2=2*NSIG*NSIG
      XF=SQRT(2.0)*NVAR2
      THRESH=FAC*SQRT(2.0)*NSIG
      DO 60 J=2,NPTS
      J1=J-1
      EDS=ESIG(J1)
      XPRED=EST*RA
      CORE=XF/EDS
      TMP=IN(J)-XPRED
      IF(EDS.EQ.0.0.OR.ABS(TMP).LE.CORE) THEN
         TMP=MEAN(J)-XPRED
         IF(TMP.LE.DEC(MID)) GO TO 10
         GO TO 30
      ENDIF
      IF(TMP.GT.CORE) THEN
         TMP=TMP-CORE
         IF(TMP.LE.DEC(MID)) GO TO 10
         GO TO 30
      ENDIF
      TMP=TMP+CORE
      IF(TMP.GT.DEC(MID)) GO TO 30
```

```
   10 DO 20 I=1,MID
         IF(TMP.LE.DEC(I)) THEN
            DIFF=REC(I)
            GO TO 50
         ENDIF
   20 CONTINUE
   30 DO 40 I=MID+1,NLEVEL
         IF(TMP.LE.DEC(I)) THEN
            DIFF=REC(I)
            GO TO 50
         ENDIF
   40 CONTINUE
   50 EST=DIFF+XPRED
      IF(DIFF.EQ.0.0) EST=XPRED/RA
      OUT(J)=EST
   60 CONTINUE
      END
C
C

SUBROUTINE DSEGMT
C
C SUBROUTINE TO ESTIMATE THE PIXEL MEAN AND SIGNAL VALUES BY ISOLATING
C STATIONARY SIGNAL REGIONS USING A HYPOTHESIS TEST ON THE RATIO OF
C MAXIMUM LIKELIHOOD ESTIMATES OF LAPLACIAN SIGMAS FOR THE DIFFERENTIAL
C SIGNAL.  THE RESULTS ARE THEN USED IN PROGRAM RESTOR IN THE DIFFERENTIAL
C MAP ESTIMATE EQUATIONS FOR LAPLACIAN SIGNAL AND ADDITIVE GAUSSIAN NOISE.
C
      PARAMETER (NPTS=512,NLEV=16)
      COMMON/BLOCK/IN(NPTS),OUT(NPTS),MEAN(NPTS),ESIG(NPTS-1),DEC(NLEV),
     $              REC(NLEV),RA,NSIG,H0L,H0H
      REAL IN,OUT,REC,DEC,MEAN,ESIG,NSIG,NVAR2,
     $     SEGM(NPTS),SEGS(NPTS)
      INTEGER SEGP(NPTS)
      NSEG=1
      NUM=2
      XF=SQRT(2.0)
      NVAR=NSIG*NSIG
      SUM=IN(2)+IN(1)
      SEGP(1)=1
      SIG0=ABS(IN(2)-IN(1))
      SIG0=SIG0*SIG0
      IF(SIG0.GT.NVAR) THEN
         SIG0=SQRT(SIG0-NVAR)
      ELSE
         SIG0=0.0
      ENDIF
      DO 20 J=3,NPTS
      SIG=ABS(IN(J)-IN(J-1))
      SIG=SIG*SIG
      IF(SIG.GT.NVAR) THEN
         SIG=SQRT(SIG-NVAR)
      ELSE
         SIG=0.0
      ENDIF
      IF(SIG0.EQ.0.0) THEN
         RATIO=1.E40
         IF(SIG.EQ.0.0) RATIO=1.0
         GO TO 10
      ENDIF
      RATIO=SIG/SIG0
   10 IF(RATIO.LE.H0H.AND.RATIO.GE.H0L) THEN
         NUM=NUM+1
         SIG0=SQRT(SIG0*SIG0+NVAR)
         SIG=SQRT(SIG*SIG+NVAR)
         SIG0=((NUM-1)*SIG0+SIG)/NUM
         SIG0=SQRT(SIG0*SIG0-NVAR)
         SUM=SUM+IN(J)
      ELSE
         SEGM(NSEG)=SUM
```

```
            SEGS(NSEG)=SIG0
            NSEG=NSEG+1
            SEGP(NSEG)=J
            NUM=1
            SIG0=SIG
            SUM=IN(J)
         ENDIF
   20 CONTINUE
         SEGM(NSEG)=SUM
         SEGS(NSEG)=SIG0
         SEGP(NSEG+1)=NPTS+1
         NSEG=2
         NEW=SEGP(2)
         NUM=SEGP(2)-SEGP(1)
         MEAN(1)=SEGM(1)/NUM
         MEAN(2)=MEAN(1)
         ESIG(1)=XF*SEGS(1)
         DO 30 J=3,NPTS
         IF(J.LT.NEW) THEN
            MEAN(J)=MEAN(J-1)
            ESIG(J-1)=ESIG(J-2)
         ELSE
            NUM=SEGP(NSEG+1)-SEGP(NSEG)
            MEAN(J)=SEGM(NSEG)/NUM
            ESIG(J-1)=XF*SEGS(NSEG)
            NSEG=NSEG+1
            NEW=SEGP(NSEG)
         ENDIF
   30 CONTINUE
         RETURN
         END
C
C
         SUBROUTINE RATIO(ALPHA)
C
C SUBROUTINE TO CALCULATE THE HYPTHESIS TEST RATIO FOR DETERMINING
C STATIONARY SIGNAL REGIONS FOR DSEGMT.  SUBROUTINE MDGAM IS A STANDARD
C STATISTICAL ROUTINE TO CALCULATE THE CUMMULATIVE PROBABILITY OF A
C GAMMA DISTRIBUTION WHICH IS THE APPROPRIATE DISTRIBUTION FOR A
C HYPOTHESIS TEST ON THE RATIO OF TWO LAPLACIAN SIGMA VALUES.
C
         COMMON/BLOCK/IN(NPTS),OUT(NPTS),MEAN(NPTS),ESIG(NPTS-1),DEC(NLEV),
        $              REC(NLEV),RA,NSIG,H0L,H0H
         REAL IN,OUT,REC,DEC,MEAN,ESIG,NSIG,NVAR2
         REAL*8 A,B,P,HALF,PROB
         HALF=DBLE(ALPHA/2.0)
         P=1.0
         DO 10 J=1,1001
         A=(J-1)*0.001
         CALL MDGAM(A,P,PROB,IER)
         IF(HALF.LE.PROB) GO TO 20
   10 CONTINUE
   20 H0L=SNGL(A)
         DO 30 J=5001,1,-1
         B=(J-1)*0.001
         CALL MDGAM(B,P,PROB,IER)
         PROB=1.0-PROB
         IF(HALF.LE.PROB) GO TO 40
   30 CONTINUE
   40 H0H=SNGL(B)
         RETURN
         END
```

I claim:
1. A signal processing method for reducing noise in an image signal, comprising the steps of:
(a) sampling an image to produce a sampled image signal representing pixel amplitude values, the sampled image signal including noise having a known probability density function (pdf);
(b) digitizing the pixel amplitude values to produce a digital image;
(c) forming an image difference signal from the digital image signal by taking the difference between successive pixel amplitude values;
(d) processing the image difference signal in digital processing means including a digital MAP filter incorporating a MAP estimator for estimating the signal and noise pdf's of a signal having a Laplacian pdf degraded by noise having a known pdf, to produce a MAP filtered image difference signal; and (e) recovering a restored digital image signal from the MAP filtered image difference signal by summing successive amplitude difference values in the MAP filtered image difference signal.

2. The image signal processing method claimed in claim 1, wherein the MAP filter employs an estimate of the noise variance, and further including the step of estimating the noise variance and employing the noise variance estimate in the MAP filter.

3. The image signal processing method claimed in claim 2, wherein the MAP filter employs local variance estimates of the image difference signal, and further including the steps of:

(a) segmenting the image difference signal into segments of constant variance employing a generalized-likelihood-ratio-test, and employing the variance of the segments in the MAP filter.

4. The image signal processing method claimed in claim 3, wherein the noise is signal dependent, and further including the steps of:

(a) first performing a transformation on the image signal that renders the noise signal independent; and (b) performing the inverse transformation on the restored image signal.

5. The image signal processing method claimed in claim 4, wherein the image signal is derived from a photographic image degraded by film grain noise being signal dependent and having a Gaussian pdf, said transformation having the form $$f(x) = C_1 \int_0^x \frac{1}{\sigma_n(S')} dS' + C_2$$

wherein $C_1$ and $C_2$ are arbitrary constants and $\sigma_n(S')$ is the Selwyn granularity measured as a function of photographic density $S'$, $C_1$ being the estimate of the noise variance $\sigma_n$ that is supplied to the MAP filter.

6. The image signal processing method claimed in claim 5, wherein said MAP filter implements the operation $$\Delta S = \begin{cases} \Delta X + \dfrac{2\sqrt{2}\,\sigma_n^2}{\sigma_{\Delta S}}, & \Delta X < \dfrac{-2\sqrt{2}\,\sigma_n^2}{\sigma_{\Delta S}} \\ \Delta X - \dfrac{2\sqrt{2}\,\sigma_n^2}{\sigma_{\Delta S}}, & \Delta X > \dfrac{2\sqrt{2}\,\sigma_n^2}{\sigma_{\Delta S}} \\ 0, & |\Delta X| \leq \dfrac{2\sqrt{2}\,\sigma_n^2}{\sigma_{\Delta S}} \end{cases}$$

where $\Delta S$ is the map filtered image difference signal, $\Delta X$ is the noisy image difference signal, and $\sigma_{\Delta S}$ is the estimate of the variance of the original image difference signal.

7. The image signal processing method claimed in claim 6, including the steps of:

(a) determining the mean value of X in the segments when $\Delta S = 0$; and (b) employing said mean value as the processed signal value in such segments.

8. A DPCM digital image transmission system, comprising:

(a) an encoder for converting a digital image signal to a differential pulse code modulated (DPCM) image signal, the encoder including, (1) a differencing means for forming the DPCM image signal by taking the difference between an incoming digital image signal and a prediction signal, (2) MAP filter means comprising a programmed digital device for, receiving the DPCM image signal, and producing a MAP filtered DPCM image signal, the MAP filter incorporating a MAP estimator for estimating the signal and noise pdf's of a signal having a Laplacian pdf degraded by noise having a known pdf, (3) a quantizer, receiving the DPCM image signal and producing a quantized DPCM image signal;

(4) a feedback loop including a predictor for receiving the quantized DPCM image signal from the quantizer and generating and supplying the prediction signal to the differencing means;

(b) a communication channel for the quantized DPCM image signal;

(c) a decoder for decoding the DPCM image signal, including, (1) summing means for forming an image signal by summing the DPCM image signal and a prediction signal, and (2) a feedback loop for receiving the image signal from the summing means and generating and supplying the prediction signal to the summing means.

9. The DPCM digital image transmission system claimed in claim 8, wherein the noise is signal dependent noise, and further comprising:

(a) programmed digital device means in the encoder for performing a transformation on the image signal prior to the differencing means to render noise in the signal, signal independent; and (b) programmed digital device means in the decoder for performing an inverse transformation on the image signal.

10. The DPCM digital image transmission system claimed in claim 8, wherein said MAP filter means employs local variance estimates of the image difference signal, and further comprising:

(a) segment generation means comprising a programmed digital device for separating the image signal into segments having constant variance, said segment generation means including means for applying a generalized-likelihood-ratio-test to successive samples of the DPCM image signal, and for supplying the MAP filter means with estimates of the variance of the respective segments.

* * * * *

UNITED STATES PATENT AND TRADEMARK OFFICE
CERTIFICATE OF CORRECTION

PATENT NO. : 4,918,633

DATED : April 17, 1990

INVENTOR(S) : James R. Sullivan

It is certified that error appears in the above-identified patent and that said Letters Patent is hereby corrected as shown below:

Column 21, line 39      Equation $$``f(x) = c_1 \int_0^x \frac{1}{\sigma_n(S')} dS' + c_2"$$

should read $$--f(x) = c_1 \int_0^x \frac{1}{\sigma_n(S')} dS' + c_2 --$$

Column 22, line 6      Equation $$``\Delta S = 0; \text{ and}"$$

should read $$-- \Delta \dot{S} = 0; \text{ and} --$$

Signed and Sealed this

Thirtieth Day of July, 1991

*Attest:*

HARRY F. MANBECK, JR.

*Attesting Officer*      *Commissioner of Patents and Trademarks*